July 10, 1951 A. H. REEVES 2,559,661

MULTICHANNEL ELECTRICAL PULSE COMMUNICATION SYSTEM

Filed April 2, 1947 4 Sheets-Sheet 1

INVENTOR.
ALEC HARLEY REEVES
BY
Robert Harding Jr.
ATTORNEY

INVENTOR.
ALEC HARLEY REEVES
BY Robert Harding Jr.
ATTORNEY

INVENTOR.
ALEC HARLEY REEVES
BY
Robert Harding Jr.
ATTORNEY

MULTICHANNEL ELECTRICAL PULSE COMMUNICATION SYSTEM

Filed April 2, 1947 4 Sheets-Sheet 4

INVENTOR.
ALEC HARLEY REEVES
BY
Robert Harding Jr.
ATTORNEY

Patented July 10, 1951 2,559,661

UNITED STATES PATENT OFFICE 2,559,661

MULTICHANNEL ELECTRICAL PULSE COMMUNICATION SYSTEM

Alec Harley Reeves, London, England, assignor to International Standard Electric Corporation, New York, N. Y., a corporation of Delaware Application April 2, 1947, Serial No. 738,954

12 Claims. (Cl. 179—15)

This invention relates to a multichannel communication system. More particularly it deals with a system for modulating pulses by signals and rearranging the repetition periods of these pulses to reduce interference between pulses of different signal channels.

The principles of modulating pulses by signals have been described in detail in the U. S. Patents Nos. 2,262,838 and 2,266,401, as well as several copending applications. As explained in these patents it is not necessary to transmit the variations in amplitude of a signal continuously but it is sufficient to send discrete pulses, representing amplitude values, spaced at intervals not longer than about ⅓ of the period of the highest signal frequency to be transmitted. These amplitude values may be transmitted as amplitude modulated pulses, frequency modulated pulses, or time modulated pulses. Since it is sufficient to send only a small fraction of each signal the space between the pulses representing this fraction of the signals may be interleaved with pulses of other signals to produce a multichannel pulse wave. If the pulses of different signal channels are interleaved in time too close to each other, interference between the pulses of different channels will occur and produce what is known as "cross-talk." Accordingly, it is the purpose of this invention to rearrange the pulses of different signal channels on a multichannel pulse wave so as to reduce this cross-talk. This is accomplished by grouping pulses of the same channel together and increasing the time spacing between these groups. Then after transmission and reception of the rearranged pulses, the groups are separated and the pulses comprising them are re-spaced according to their original spacing for demodulation. In performing this function of rearranging the pulses, it has been found that a much cross-talk ratio may be tolerated between the pulses in a given group than can be tolerated between the interleaved pulses of the adjacent different signal channel pulses. This re-arrangement permits a closer grouping or time spacing of the pulses within a group thereby increasing the available time spaces for pulses of other signal channels on the same carrier wave or medium without substantial increase in the width of the carrier wave frequency band.

Accordingly, it is an object of this invention to provide a novel and effective modulated pulse multi-channel communication system.

Another object is to reduce the interference between channels in a modulated pulse multichannel communication system, which in the case of audio signals is commonly referred to as cross-talk.

Another object is to increase the number of different signal channels which may be transmitted on modulated pulses over a given frequency band width.

Another object is to reduce the cross-talk for a given bandwidth, or to use a greater bandwidth for a given cross-talk.

Another object is to provide a novel and effective distribution and delay means for rearranging the pulses in a multichannel communication system.

Another object is to provide novel and effective means for separating and demodulating the modulated pulses rearranged according to the multichannel communication system of this invention.

Still other objects will appear from time to time in the description which follows.

Generally speaking, the essential features of the modulated pulse multichannel communication system of this invention comprises: (1) means to rearrange the time spacing of a given number of pulses in each of the trains of different signal modulated pulses to produce trains of regularly recurring groups of modulated pulses; (2) means to interleave these groups of pulses of these different pulse trains to form a single multi-channel pulse wave; (3) means to transmit the multichannel pulse wave; (4) means to receive the multi-channel pulse wave; and (5) means to rearrange and/or separate the groups of pulses of the multichannel pulse wave to reproduce the original pulse trains which may be demodulated according to any of the known pulse demodulating procedures.

As disclosed in the above-mentioned patents the signals of each different channel to be transmitted by the system of this invention modulate pulses at a regularly recurring rate. In order to facilitate rearrangement of the pulses according to the system of this invention and to prevent undue interference, the repetition rates of the pulses of the different signal channels should be the same or should be even multiples of each other. This is accomplished by synchronizing the pulse modulators for each of the different signal channels with the same or identical synchronizing circuits or base wave generators. A given number of pulses from the resulting trains of regularly and evenly time spaced signal modulated pulses are then selected for each group and rearranged in time spacing or bunched together to form a train of groups of closely time spaced pulses, which groups recur at a regular repetition rate. The means for rearranging these pulses into these groups comprises a network of delay devices such as a network of trigger circuits, wherein a separate and differently timed delay device is provided for each one of the pulses of the group.

In order to mix or interleave the rearranged groups of pulses of each of the separate signal channel pulse trains to produce the desired rearranged multi-channel pulsewave, a special electronic distributive device may be employed such as a cathode ray tube having a plurality of targets, one for each of the pulses in each of the different recurring groups of pulses. Such a cathode ray tube may take the form of a "Cyclophon" described in the copending application of Labin et al. (37-95), Ser. No. 565,152, filed November 25, 1944, now U. S. Patent No. 2,465,380, granted March 29, 1949, or of a "Cyclodos" described in copending application of Labin et al. (86-94), Ser. No. 591,065, filed April 4, 1945, now U. S. Patent No. 2,429,631, granted October 28, 1947, if time modulated pulses are employed. Instead of such an electronic mixing device, a series of channel deblocking circuits may be provided which are joined to a suitably isolated mixing circuit. This mixing circuit may comprise a series of vacuum tubes having interconnected anode circuits.

The resulting rearranged multichannel pulse wave may then be transmitted and received over any suitable medium, such as by radio or through a coaxial cable or the like. The receiver for receiving the transmitted rearranged multichannel pulse wave is designed to cooperate with the type of transmitter employed, so that the transmitted wave may be detected and reproduced without distortion, for separation of any one or more of the signal channels thereon and the demodulation of those channels.

Since the time spacing of the pulses in each group is different from that of time spacing of those portions of the original signal modulated pulses, the different groups of pulses must be separated from each other to produce trains of grouped pulses and these groups of pulses must again be rearranged or spread out to reproduce the original signal channel pulse trains before they are demodulated. This also may be accomplished in an electronic distributor device, such as a "Cyclophon" or in a suitable deblocking circuit, or a combination of both. In order to facilitate the separation of the different signal channels, a synchronizing pulse may be transmitted over one or more of the channels or group spaces on the multichannel pulse wave, which synchronizing pulse may be separated in a suitable circuit for synchronizing the electronic distributor or separating and demodulation circuits. However, the group repetition rate may be detected by suitable filter means for generating such a suitable synchronizing wave in the absence of a specific synchronizing signal.

After the trains of groups of pulses are separated from the received multichannel pulse wave, the pulses in each group may be arranged by suitable delay networks, similar to those mentioned above for grouping these pulses, wherein a separate delay device, such as a trigger circuit, is employed for each one of the pulses, having time constant circuit of the proper value for spreading the time spacing of the pulses evenly again along signal channel pulse trains. These trains may then be directly passed to suitable demodulators for reproduction of the signals thereon. One advantage of employing an electronic distributor device of the "Cyclophon" type is that demodulation as well as separation of the pulses may be simultaneously accomplished therein as described in the above-mentioned Labin et al. application Ser. No. 565,152.

The above steps in the communication system of this invention are applicable both to electromagnetic and electrical wave systems as well as to acoustic or ultrasonic waves in gases, liquids or solids. Similarly, acoustic delay lines and devices may be employed in the place of the trigger circuits above-mentioned.

While the invention itself is defined in the appended claims, the foregoing and other features and objects of the invention will become more apparent and the invention best understood upon consideration of the following detailed description of an embodiment of the invention to be read in connection with the accompanying drawings in which:

Figure 1:
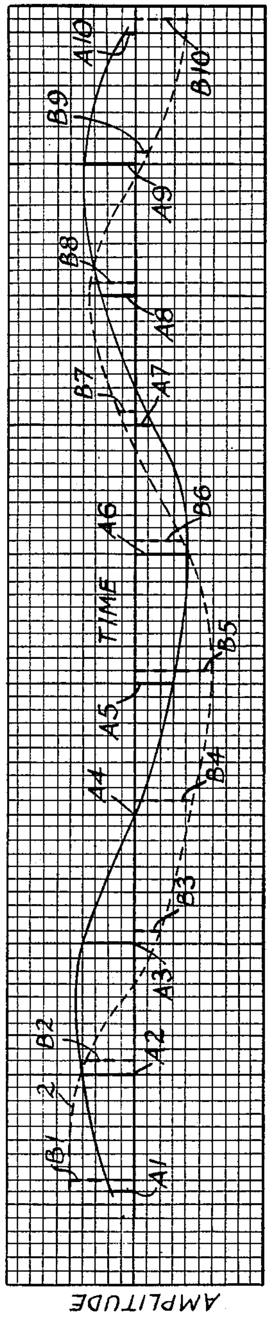
Fig. 1 is a graph of an amplitude modulated multichannel pulse wave produced according to previous multichannel pulse modulated methods.
Figure 2:
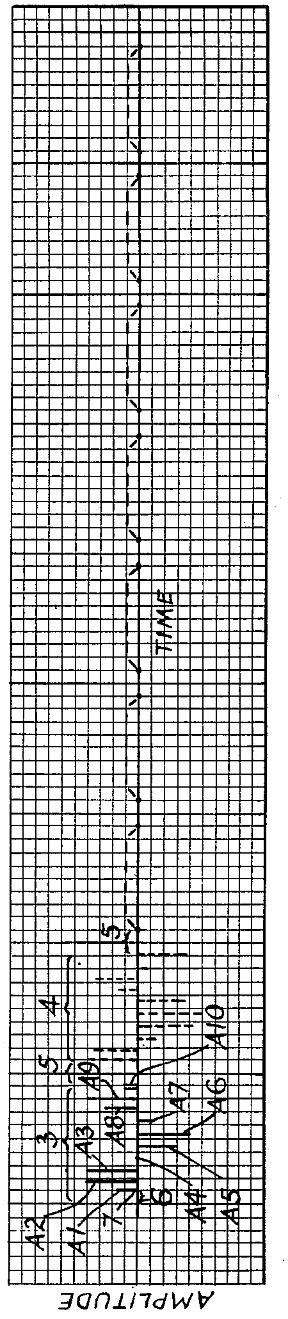
Fig. 2 is a graph of a multichannel pulse wave showing the pulses of the wave in Fig. 1 rearranged into groups according to the system of this invention.

For the purpose of illustration the modulated pulses disclosed in Figs. 1 and 2 will be shown to be amplitude modulated according to the signals of the ten different signal channels A, B, C, D, E, F, G, H, I and J. However, the pulses may be time modulated instead of amplitude modulated as described in the above-mentioned patents. Referring specifically to Fig. 1 the wave 1 represents the audio frequency wave for signal channel A and the dotted wave 2 represents the audio frequency wave for signal channel B. The other eight signal channel waves are not shown in Fig. 1 to avoid confusion. As previously stated, it is not necessary to transmit the variation in amplitude of waves 1 and 2 continuously, since discrete amplitude values at regularly spaced intervals may be transmitted and still give sufficiently complete reproduction of the original audio frequency wave. These different amplitude values are represented by the pulses A—1, A—2, A—3, A—4, A—5, etc., in Fig. 1 and similarly the dotted pulses B—1, B—2, B—3, etc., for signal channel B. The A pulses and the B pulses as well as the pulses of each of the other signal channels have the same repetition rate and are shown out of phase with each other so as not to cause interference for convenience and to illustrate prior multichannel pulse waves. Since the pulses do not have absolutely vertical leading and trailing edges but are wider at their base than at their peaks, overlap may occur between two successive pulses if the time spacing between A—1 and B—1 were too small, thereby producing cross-talk in either or both channels A and B. Accordingly, the space between the pulses must be sufficient to prevent such cross-talk, particularly if adjacent pulses are of different signal channels as shown in Fig. 1. For example, in telephony, wherein pulses of say a half or one micro-second in width or duration are employed, it has been found that no pulse should approach that pulse of another channel closer than about two and a half microseconds in general in order to prevent interaction greater than about 60 decibels down. However, if the two adjacent pulses are of the same signal channel a figure of about 15 decibels down is in general allowable with a spacing of about one microsecond without material interference, thereby permitting the transmission of about two and a half times as many channels as before over about the same frequency band width.

Thus, the pulses of each signal channel are arranged into groups of an equal number of pulses which groups contain pulses that are closely spaced in time different groups of pulses being farther apart in time than the distance between the pulses in each group as is shown in the wave on Fig. 2. In this figure the pulses A—1, A—2 . . . A—10 have been bunched together within the time space or bracketed distance 3 and similarly pulses B—1, B—2 . . . B—10 have been bunched together within the time space 4, etc., with the time space 5 between each one of the groups. This is accomplished by delaying pulse A—1 substantially one complete cycle, represented by the entire length in time taken-up by the ten A pulses in Fig. 1 plus the time 6 shown in Fig. 2. This considers the point 7 on the wave in Fig. 2 starting in time at the point of pulse A—10 in Fig. 1, and the spacing between pulse A—1 in Fig. 1 and A—1 in Fig. 2 to be 91 time units; the time delay between pulse A—2 in Fig. 1 and A—2 in Fig. 2 to be 81.9 time units; the time units between pulse A—3 in Fig. 1 and A—3 in Fig. 2 to be 72.8; etc. In this way all the pulses are compressed in time into a space of 9.1 time units, which is less than the original time interval between adjacent pulses of the same signal channel shown in Fig. 1. Similarly, the pulses of channel B, may be delayed to fit in the space 4 in Fig. 2 by adding 10 time units to each delay illustrated above. Between the last pulse A—10 in group 3 of channel A in Fig. 2 and the first pulse B—1 in group 4 of channel B, there is a time interval of 1.9 time units, as distinguished between only 0.91 time unit between pulses of different signal channels in Fig. 1. This increased time spacing between pulses of different channels materially reduces the cross-talk between them.

The number of pulses in each group is not important in that more or fewer than ten, such as five, may be employed if desired. However, the smaller the number of pulses in each group the less time spacing on the wave is saved for more different signal channels, since more large spacings are required between the different groups of pulses. Similarly, for a given band width the more pulses that are in one group the less portions of any given signal wave may be transmitted in a given time, which may tend to decrease its fidelity.

Although only one cycle of groups of pulses are shown in Figs. 1 and 2, similar cycles of groups of pulses recur along the wave which cycles or groups may be separated by synchronizing or marker pulses (not shown). However, the repetition rate of each of the groups 3, 4, etc., along the wave shown in Fig. 2 may be determined in a properly tuned circuit from which a synchronizing wave may be generated at the receiving end of the system for synchronizing the pulse separator and demodulator circuits.

Figure 3:
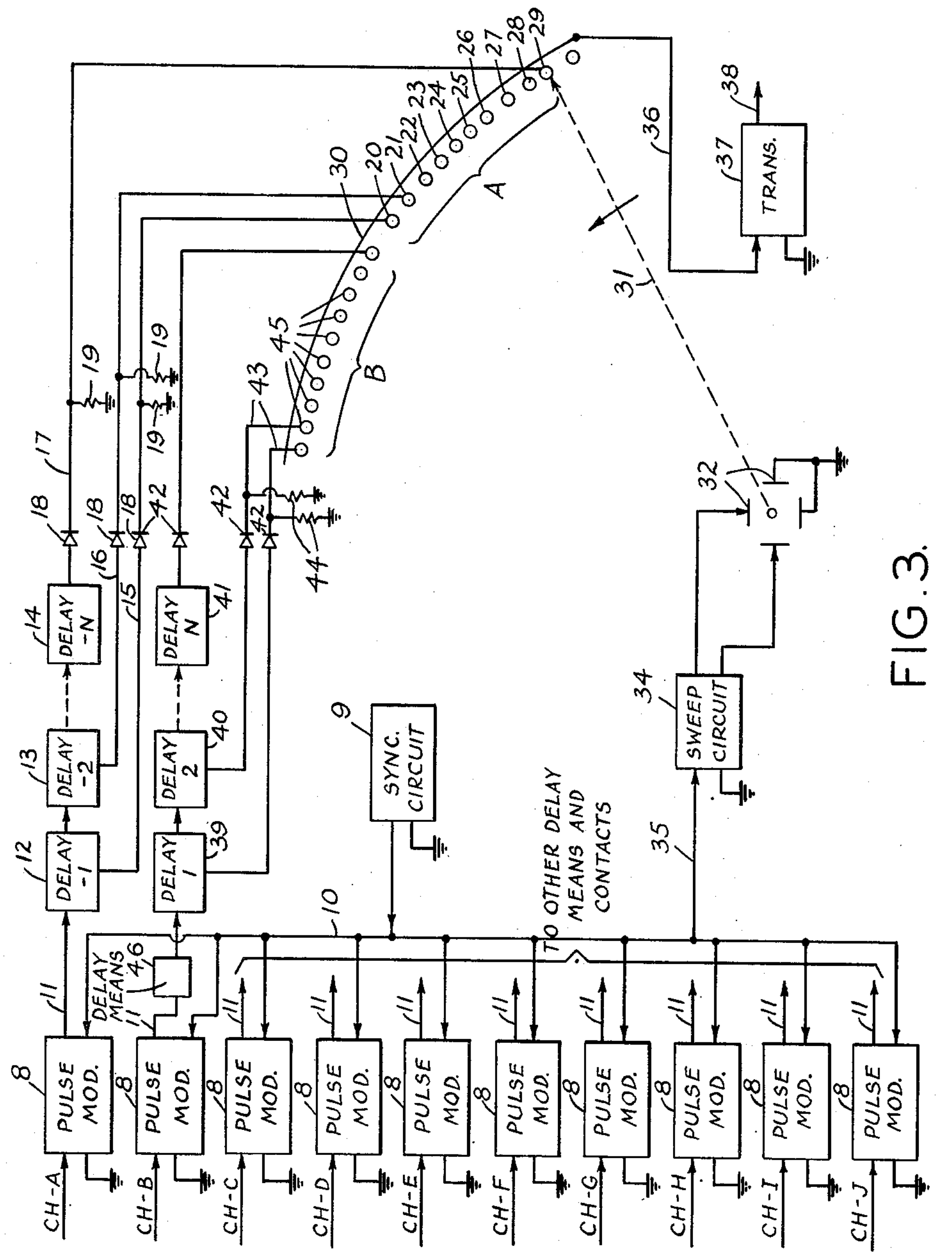
Fig. 3 is a schematic block wiring diagram of the system for rearranging the pulses according to the waves shown in Fig. 2.

The transmitting portion of this system is schematically shown in Fig. 3 wherein the ten separate signal channels A through J are introduced into separate pulse modulator circuits 8, each of which is synchronized by a common synchronizing circuit 9 through lines 10. The pulse modulator circuits 8 may be of any known type for modulating the signals according to amplitude pulses as shown in Figs. 1 and 2, or according to time modulated pulses as described in the above-mentioned patents. The synchronizing circuit 9 may comprise a base wave generator having a frequency equal to that of the pulse repetition rate, or an even submultiple thereof. The separate trains of regularly recurring signal modulated pulses are separately passed through lines 11 into networks of delay devices to delay the pulses shown in Fig. 1 to the group positions shown in Fig. 2. For each one of the 10 pulses which makes-up group 3 for channel A, there is provided a separate delay device 12, 13, etc., . . . 14 corresponding to delay -1, -2 . . . $n$, wherein $n$ is 10. From each one of these delay devices is a line 15, 16—17 containing a rectifier 18 and a resistance 19 to ground. These lines 15, 16—17 may be connected to the separate group A dynode targets 20, 21, 22, 23, 24, 25, 26, 27, 28 and 29 having a common collector electrode 30 of a cathode ray distributing device. These targets are struck in succession by a cathode ray beam 31 controlled by deflection plates 32 coupled to a sweep circuit 34 synchronized by the synchronizing circuit 9 through lines 10 and 35. The common collector 30 is coupled through line 36 to a suitable transmitter 37 from which is with-drawn through line 38 the desired grouped or rearranged multichannel pulse wave shown in Fig. 2.

Operation of this pulse rearranging or grouping circuit is as follows: The different pulses A—1, A—2 . . . A—10 are successively passed through the delay devices 12, 13—14, from which are withdrawn trains of correspondingly delayed pulses through lines 15, 16 . . . 18, passed to the corresponding targets 20 through 29 of the collector 30. After pulse A—1 passes through delay device 12 to target 20 is passes on to delay device 13 to target 21 while the next pulse A—2 passes to target 20.

The time constant of the circuits connecting the pulses to the targets is sufficiently short so as to permit the charge produced on each of said targets by a pulse to leak off before the next pulse is applied. Thus, for example, the charge of pulse A—1 leaks off target 20 through resistance 19 to ground before the pulse A—2 is applied thereon. Similarly, other succeeding pulses are applied to each one of the targets 21 to 29 and leak off. When the A—1 pulse reaches target 29, the beam 31 strikes the target 29 causing secondary electrons to be emitted thereby and collected by collector 30. When the beam 31 moves on to strike target 28, pulse A—2 is being applied at that time to target 28, and the impingement of the beam upon target 28 likewise causes electrons to flow to collector 30, thus producing a corresponding current pulse in line 36. Succeeding pulses A—3 to A—10 similarly reach their corresponding target as the beam strikes the target. The beam 31 is so synchronized as to sweep across the targets 29—20 and then pass to the next series of ten targets corresponding to the next signal channel, B, and similarly on around the cathode ray device past all its hundred targets, each time striking a target at the time the corresponding pulse is applied thereto.

Similarly, the pulse grouping circuit for signal channel B comprises a series of delay devices 39, 40—41 (corresponding to delay devices 12, 13—14) for correspondingly delaying the pulses B—1, B—2 . . . B—10 before being passed through rectifiers 42 in line 43 (grounded through resistance 44) and applied to the group of targets 45 corresponding to channel B on the cathode ray distributing device. However, to prevent overlap of the pulses of group 4 with those of group 3 an additional delay means 46 is inserted in the line 11 between the pulse modulator 8 for channel B and the series of delay devices 39, 40—41. This delay device 46 is sufficient to space the group of pulses 4 a time space 5 from the last pulse A—10 in group 3 shown in Fig. 2. Correspondingly, a space is provided between target 20 and the first target 45 in the cathode ray distributing device. Similarly, other delay means like 46 are inserted in lines 11 for the other signal channel modulators to cause the groups of pulses to be properly spaced from each other.

Although Fig. 1 shows the pulses of the different signal channels out of phase with each other, such is not necessary in the circuit shown in Fig. 3, since the delay means 46 may be adjusted to prevent overlap of the final groups of pulses. Therefore the repetition rates of the signal modulated pulses in each line 11 may be the same both in frequency and phase.

Figure 4:
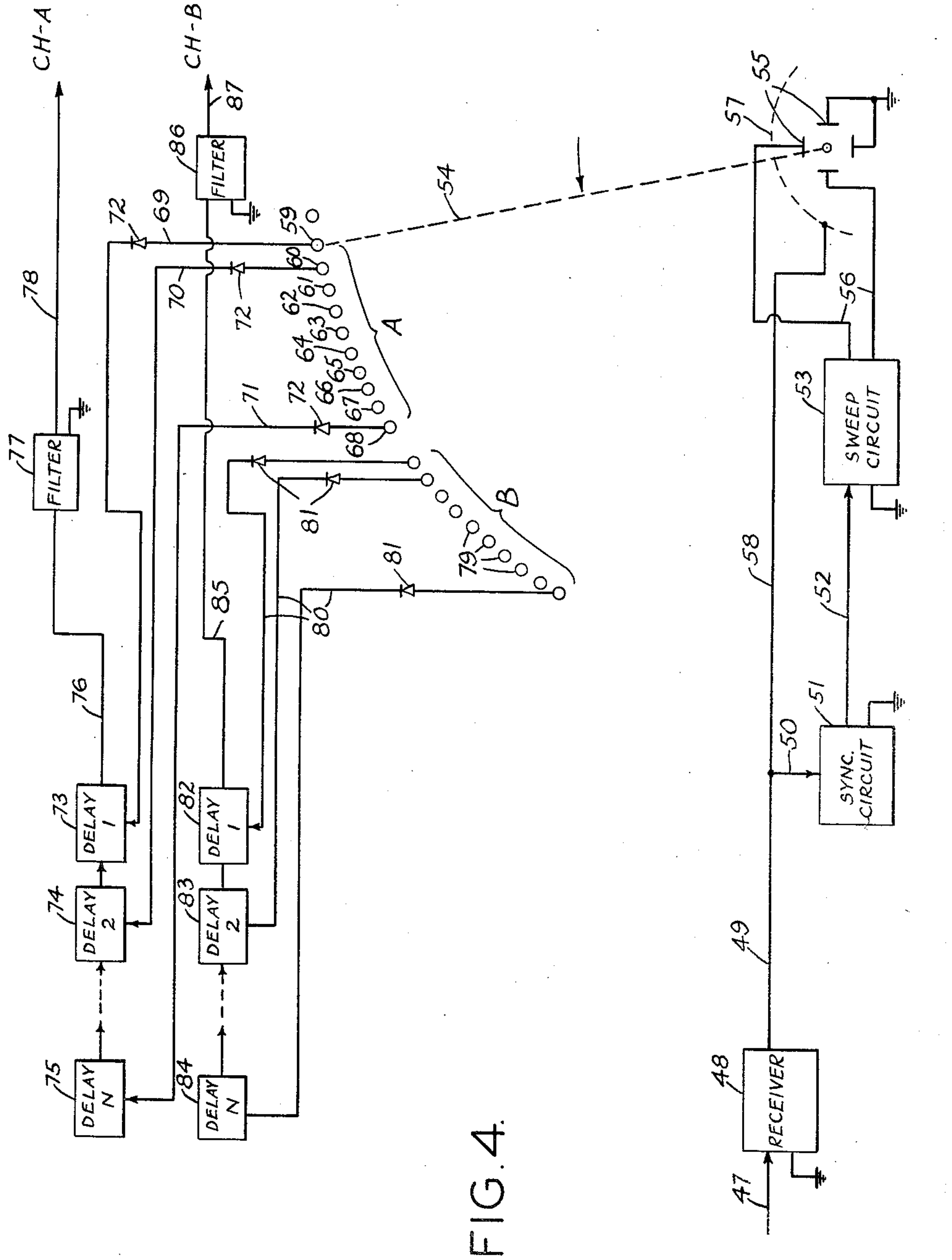
Fig. 4 is a schematic block wiring diagram of a system for separating the wave shown in Fig. 2 into a plurality of separate trains of signal channel pulses spaced according to those shown on the wave in Fig. 1.

The signal from the transmitter 37 shown in Fig. 3 may be transmitted by radio or over any other suitable medium and received through line 47 in a suitable receiver and detector 48 shown in Fig. 4. From the circuit 48 the received grouped or rearranged multichannel pulse wave shown in Fig. 2 is passed through lines 49 and 50 into a synchronizing circuit 51 which may comprise means for selecting synchronizing pulses (not shown on the wave shown in Fig. 2), or means for producing a synchronizing wave from the repetition rate of the groups of pulses thereon. The resulting synchronizing wave may be withdrawn from circuit 51 through line 52 to a sweep circuit 53 which may be employed for controlling the sweep of a cathode ray beam 54 in a cathode ray distributor device having deflecting plates 55 coupled through lines 56 to the sweep circuit 53. The grid 57 of the cathode ray device may be connected to line 49 through line 58 to control the intensity of the beam in accordance with the pulses on the wave in Fig. 2. At the target end of the cahode ray device are a series of targets 59, 60, 61, 62, 63, 64, 65, 66, 67, 68 and others corresponding to each one of the pulses for each group along the wave shown in Fig. 2. As the cathode ray beam 54 passes each one of these targets 59 through 68 in synchronism with the location of the pulses A—1, A—2 . . . A—10 on the wave in Fig. 2 the beam 54 is intensified according to the amplitude of the pulses A—1, A—2 . . . A—10, thus producing a proportional current flow in the form of a pulse from one of the targets 59 through 68. These pulses pass through lines 69, 70—71 containing rectifiers 72 to the delay devices 73, 74—75 (similar to delay device 12, 13, 14 shown in Fig. 1) wherein their time position on channel A is again arranged to correspond to that shown in Fig. 1. These redelayed pulses are then withdrawn from the series coupled delay device 73, -74—75 through line 76 to produce a train of evenly spaced pulses. This train may then be passed to a suitable demodulator circuit, which, in the case of the amplitude modulated pulses as shown, may comprise a suitable filter 77. The resulting demodulated signal, corresponding to signal channel A, may then be withdrawn from filter 77 through line 78 as wave 1 in Fig. 1.

Similarly, a group of targets 79 corresponding to channel B are provided along the sweep circuit of the beam 54 in the cathode ray device. The targets 79 are coupled through lines 80 containing rectifiers 81, to another series of delay devices 82, 83—84 (similar to 73, 74—75) from which may be withdrawn through line 85 the pulse train B—1, B—2, B—3 . . . B—10 shown in Fig. 1. This train of B pulses also may be passed through a suitable demodulator or filter 86 (similar to 77) for reproduction of the signal wave 2 and withdrawn through line 87. Similarly, the other signal channels C through J have corresponding groups of ten targets around the sweep path in the cathode ray device for contact with the beam 54 to separate the separate signal channels, as well as having similar networks of delay devices for rearranging the pulses according to their original spacing and demodulating the resulting pulse trains.

Rectifiers 18 and 42 in Fig. 3 and 72 and 81 in Fig. 4 are used in the lines to prevent unwanted back coupling between filter sections and between delay means.

The conventional type of passive delay network which may be used in the circuits of Figs. 3 and 4 has the advantage of simplicity and reliability against breakdown and is very flexible as to the values of delay that can be easily obtained. However, in general a slight progressive deterioration of the pulse wave form occurs as the delay sections are cascaded. If time delays of very short duration are employed it is also important that temperature and other such precautions be taken to ensure the needed constancy of delay time. To avoid these drawbacks in the case of time modulation systems, each delay service -1, -2 . . . $n$ may consist of a vacuum trigger circuit of such design that when an incoming pulse reaches it the circuit changes from one electrical equilibrium position to another, and then restores itself to the first position after the desired predetermined delay.

Figure 5:
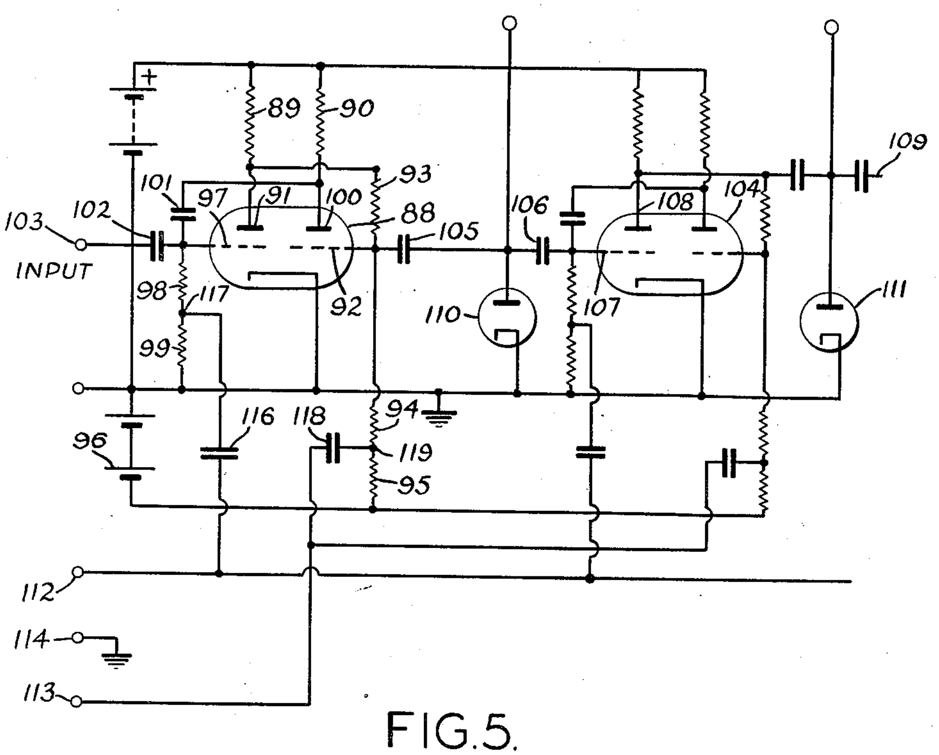
Fig. 5 is a wiring diagram of two stages of a delay device which may be employed in the circuits shown in Figs. 3 and 4.

One form of such a trigger circuit comprising two stages in series or cascade is shown in Fig. 5 each stage in the form of an Eccles-Jordan trigger circuit. The double triode 88 has anode resistors 89 and 90. Anode 91 is connected to the grid 92 through resistor 93 and any undesired positive bias is removed from grid 92 by series resistors 94 and 95 connected to the negative side of the battery 96. Grid 97 has grid resistors 98 and 99 in series to ground. Grid 97 is connected to the anode 100 through condenser 101. Such a circuit with suitable constants in the absence of applied potentials will take-up a stable position such that full current flows through the anode 91, while the grid 92 is at cut-off. On the application of a negative impulse to the grid 97 through condenser 102 from the input terminal 103, the circuit is triggered over into its second equilibrium position, in which case current flows to anode 100 while the current to anode 91 is cut-off. If no further pulses arrive, the circuit will then restore itself it its first equilibrium position after a time interval depending primarily on the values of condenser 101 and resistors 98 and 99. This delay time, before restoration to the first position, is arranged to be the value desired for that particular delay section.

A second double triode 104 is arranged in an exactly similar circuit to that of double triode 88. At the moment the circuit of the triode 88 restores itself to the equilibrium position, the current in the anode 91 rises suddenly. The resulting negative impulse generated on 91 is coupled through condensers 105 and 106 in series to the grid 107 of tube 104. The circuit of tube 104, is thus triggered to its second equilibrium position in exactly the same way as the circuit of double triode 88 was triggered by the initial incoming pulse at terminal 103. After the prearranged delay (the delay time of this second section associated with double triode 104) the circuit of tube 104 will return to its initial or first equilibrium position, in the process of which it emits a negative impulse from the anode 108 which can be used to trigger the third section which may be coupled to line 109, if desired. In this way, any number of sections may be connected in cascade.

Although with careful adjustment of the constants, the desired stable operation may be attained as described above, the tolerances on components may be increased by the addition of a rectifier tube 110, which may be either a diode or a suitable metal rectifier having low capacity. This rectifier 110 shunts to the ground all positive impulses, thus preventing the possibility of back triggering of the tube 88 on the restoring pulse of tube 104. A similar rectifier tube 111 may be provided for the next stage (not shown).

With existing types of vacuum tubes, the restoring time of the circuit may be reduced to less than 2 microseconds. The speed of restoring may be speeded up still further and the circuit delay partially stabilized by the addition of a suitable steady wave applied across the terminals 112 and 113. One form of such a suitable wave is wave 115 in Fig. 6 which may be applied between terminal 112 and the ground terminal 114. The form of the wave between terminals 113 and 114, has an equal voltage to that shown in Fig. 6 but of opposite sign, and can easily be obtained by a phase inverter (not shown). Terminal 112 is connected through condenser 116 to point 117 between resistors 98 and 99, and terminal 113 is connected through condenser 118 to point 119 between resistors 94 and 95. If we assume that all of the incoming negative pulses arrive between times 120 and 121, or between times 122 and 123, etc., shown in Fig. 6, the voltage at terminal 112 adds itself to the incoming negative pulses and is only operative between the desired time limits. The opposite phase of the voltage wave applied to the point 119 on to the second grid 92 of tube 88 produces the same effect. The amount of voltage in wave 115 is adjusted so as not to trigger the circuit itself, but is of sufficient value to insure the restoring time is always within the desired limits 120 and 121, or 122 and 123, etc. The restoring time can be reduced by this addition of the voltage to 1 microsecond or less. In this way, the desired increased speed of operation together with stabilization of the average delay times within the required limits can be achieved provided that the fundamental frequency of the wave 115 is synchronized with the scanning time.

Figure 6:
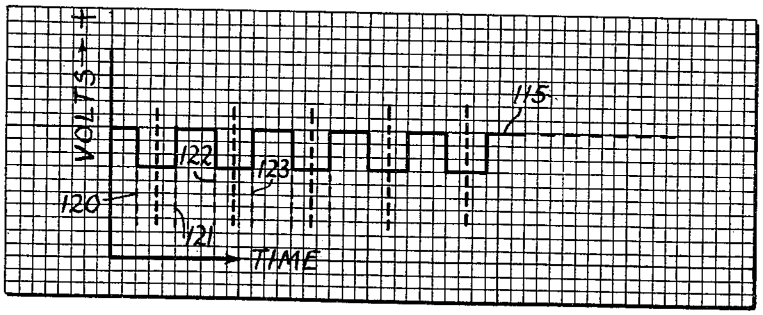
Fig. 6 is a graph of a wave form useful in explaining part of the operation of the circuit in Fig. 5.

In the same way the wave form of Fig. 6 may be applied also to all, or to a desired number, of the trigger circuits in any one group. If it is applied to all such trigger circuits, then both the speed of operation and the delay stability will be increased. If it is desired to increase the stability without increasing the speed of operation, it may be sufficient to apply the wave only to every alternate trigger, or every third trigger.

While the above is a description of the principles of this invention in connection with specific apparatus, it is to be clearly understood that this description is made only by way of example and not as a limitation on the scope of this invention.

I claim:

1. In a multiplex communication system of the type wherein each communication channel comprises a train of discrete pulses of substantially predetermined time spacing, a method of reducing interchannel crosstalk comprising changing the spacing of a predetermined number of pulses of each channel to provide relatively close grouping within the period of said predetermined spacing, and applying the grouped pulses of each channel to a common transmission medium in interleaved time relationship with other such groups, with the spacing between each of said groups exceeding the changed spacing of the pulses within each group.

2. A multichannel communication system wherein each signal channel is modulated on a separate train of pulses having the same pulse repetition rate comprising: separate means to group in time a given number of said pulses on each train to produce trains of regularly recurring groups of pulses, means to interleave said groups of different pulse trains with each other to form a multichannel pulse wave with the spacing between each of said groups exceeding the spacing of the pulses within each group, means to transmit said multichannel pulse wave, means to receive said multichannel pulse wave, and means to separate and demodulate said groups of pulses on said multichannel pulse wave to reproduce said signals.

3. The system of claim 2 wherein said means to interleave said groups of different pulse trains comprises an electronic distributor device having a plurality of targets, one for each signal channel, swept by a cathode ray beam.

4. The system of claim 2 wherein said means to interleave groups of different pulse trains comprises: a parallel grouping of electron discharge devices.

5. The system of claim 2 wherein said means to group in time a given number of pulses comprises a network of delay devices.

6. The system of claim 2 wherein means to separate and demodulate said groups of pulses includes a network of delay devices.

7. A multichannel communication system wherein each signal channel is modulated on a separate train of pulses having the same pulse repetition rate comprising: separate cascades of self-restoring trigger circuits arranged to group in time a given number of said pulses on each train to produce trains of regularly recurring groups of pulses, and means to interleave said groups of different pulse trains with each other to form a multichannel pulse wave with the spacing between each of said groups exceeding the spacing of the pulses within each group.

8. The system of claim 7 wherein said trigger circuits are restored by a steady pulse wave synchronized with the repetition rate of the pulses on the trains introduced into said circuits.

9. In a multi-channel pulse communication system of the type in which a plurality of trains of pulses, each modulated in accordance with instantaneous values of the signal in a separate one of the plurality of signal channels, are transmitted substantially simultaneously; a cathode ray tube having beam producing means, beam deflecting means and a plurality of target elements arranged to be successively struck by the beam during its deflection, means for applying a group of succeeding pulses from one of said trains to a group of succeeding ones of said targets in synchronism with the impingement of the beam on said targets, means for applying another group of succeeding pulses from another one of said trains to a succeeding group of successive targets in synchronism with the impingement of the beam thereon, means associated with said targets and responsive to the impingement of the beam on any one of said targets for producing a pulsed current flow, thereby producing a multi-channel pulse wave output in which groups of pulses from each of said trains are interleaved with each other, and means to transmit said multi-channel pulse wave.

10. A multi-channel pulse communication system according to claim 9 wherein said target elements are dynodes, and the means associated with said target elements includes a collector.

11. A multi-channel pulse communication system according to claim 9 wherein the pulses of the aforesaid plurality of trains of pulses have a regular repetition frequency and wherein said applying means includes delay means for diminishing the time interval between succeeding pulses of a group of pulses from each one of said trains.

12. A multi-channel pulse communication system according to claim 11 wherein said target elements are dynodes, and the means associated with said target elements includes a collector.

ALEC HARLEY REEVES.

REFERENCES CITED

The following references are of record in the file of this patent:

UNITED STATES PATENTS

| Number | Name | Date |
|---|---|---|
| 1,624,596 | Hartley | Apr. 12, 1927 |
| 1,671,143 | Campbell | May 29, 1928 |
| 2,089,639 | Bedford | Aug. 10, 1937 |
| 2,105,016 | Smith | Jan. 11, 1938 |
| 2,146,876 | Zworykin | Feb. 14, 1939 |
| 2,172,354 | Blumlein | Sept. 12, 1939 |
| 2,191,565 | Henroteau | Feb. 27, 1940 |
| 2,199,634 | Koch | May 7, 1940 |
| 2,272,070 | Reeves | Feb. 3, 1942 |
| 2,277,516 | Henroteau | Mar. 24, 1942 |
| 2,406,165 | Schroeder | Aug. 20, 1946 |
| 2,408,077 | Labin | Sept. 24, 1946 |

FOREIGN PATENTS

| Number | Country | Date |
|---|---|---|
| 259,328 | Great Britain | Oct. 14, 1926 |
| 587,941 | Great Britain | May 9, 1947 |